United States Patent Office 3,740,427
Patented June 19, 1973

---

3,740,427
INSECTICIDALLY ACTIVE LOWER ALKYL-SUBSTITUTED 2 - CHLORO - 2-THIONO-1,3,2-DIOXAPHOSPHORINANE
Hellmut Hoffmann, Wuppertal-Elberfeld, and Wolfgang Behrenz and Ingeborg Hammann, Cologne, Germany, assignors to Farbenfabriken Bayer Aktiengesellschaft, Leverkusen, Germany
No Drawing. Filed May 11, 1970, Ser. No. 36,502
Claims priority, application Germany, May 23, 1969,
P 19 26 565.7
Int. Cl. A01n 9/36
U.S. Cl. 424—209     10 Claims

ABSTRACT OF THE DISCLOSURE

Compositions and methods of using 2-chloro-2-thiono-1,3,2-dioxaphosphorinane containing at least two lower alkyl substituents some of which are new, which possess strong insecticidal properties, and which may be produced by particular methods.

---

The present invention relates to and has for its objects the provision of particular new active compositions in the form of mixtures with solid and liquid dispersible carrier vehicles of certain 2-chloro-2-thiono-1,3,2-dioxaphosphorinanes containing at least two lower alkyl substituents, some of which are new, and which possess valuable strong insecticidal properties, and methods for using such compounds in a new way, especially for combating and controlling insects with other and further objects becoming apparent from a study of the within specification and accompanying examples.

From U.S. patent specifications 3,270,093 and 2,922,-813 it is known that 2-dialkylamino- or 2-fluoro-2-thiono-1,3,2-dioxaphosphorinanes exhibit insecticidal activity.

The present invention provides an insecticidal composition containing as active ingredient a 2-chloro-2-thiono-1,3,2-dioxaphosphorinane derivative of the formula

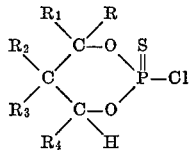

(I)

in which each of the radicals R, $R_1$, $R_2$, $R_3$ and $R_4$ denotes a hydrogen atom or a straight-chain or branched lower alkyl group, with the proviso that at least two of these radicals denote alkyl groups, in admixture with a solid diluent or carrier or in admixture with a liquid diluent or carrier containing a surface-active agent.

Surprisingly, the Compounds I to be used according to the invention as insecticides show considerably better insecticidal effectivenes than the known 2-dialkylamino- or 2-fluoro-2-thiono-1,3,2-dioxaphosphorinanes of analogous constitution and the same type of activity. The present invention therefore represents a genuine enrichment of the art.

The compounds in question are clearly defined by the Formula 1. Preferably each of the radicals R to $R_4$ stands for a hydrogen atom or a straight-chain or branched alkyl radical with 1 to 4 and more preferably 1 to 3 carbon atoms, namely a methyl, ethyl or n- or iso-propyl radical.

As examples of the substances which can be used according to the invention, there are mentioned in particular:
2-chloro-2-thiono-4,4-dimethyl-, -4,4-diethyl, -4,4-dipropyl-, -4,4,5-trimethyl-, -4,4-dimethyl-5-ethyl-, -4,4-dimethyl-5-iso-propyl-, -4,4-diethyl-5-methyl-, -4,4-diethyl-5-propyl-, -4,4-diethyl-5-iso-propyl-, -4-methyl-5-ethyl-, -4-methyl-5-propyl-, 4-methyl-5-iso-propyl-, -4,5,6-trimethyl-, -4,5,6-triethyl-, -5,5-dimethyl-, -5,5-diethyl-, -5,5-dipropyl-, -5,5-dimethyl-6-ethyl-, -5,5-diethyl-6-propyl, -5,5-dimethyl-6-isopropyl-, -5,5,6-triethyl-, -5,5-diethyl-6-iso-propyl-, -5-methyl-5-ethyl-, -5-ethyl-5-propyl- and -5,6-dimethyl-5-isopropyl-1,3,2-dioxaphosphorinane.

Some of the compounds to be used according to the present invention are known per se from the literature, for example 2-chloro - 2 - thiono-5,5-diethyl-1,3,2-dioxaphosphorinane and 2-chloro - 2 - thiono-5-ethyl-6-propyl-1,3,2-dioxaphosphorinane, which according to DAS (German published specification) 1,022,597 serve as intermediate products for the preparation of neutral esters. Some of the substances according to the invention have not yet been described; they are, however, obtainable in a simple manner according to customary methods. Thus, the compounds are obtained, for example, when (a) 1,3-alkanediols of the general Formula II

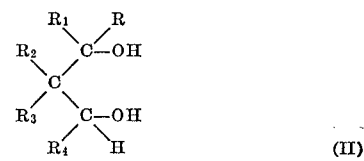

(II)

in which the symbols R to $R_4$ have the meaning given above with respect to Formula I are reacted with phosphorus sulphochloride at temperatures between 0° and 120° C. in the presence of an inert organic solvent, such as benzene or toluene, and acid acceptors, for example pyridine, or (b) 2-mercapto-2-thiono-1,3,2-dioxaphosphorinanes of the Formula III

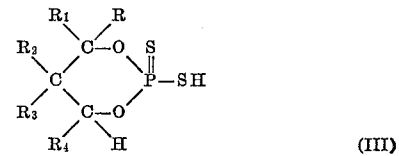

(III)

wherein the radicals R to $R_4$ have the meaning given above, are reacted with chlorine in a molar ratio of 1:1 to 1:1.5 in the presence of an inert organic solvent, such as carbon tetrachloride or toluene, at temperatures of from —20° to 40° C.

In process variant (a), the reactants are expediently combined, with stirring, in the presence of a solvent and acid-binding agent, the reaction temperature of the mixture being kept to about 40° C. by external cooling. After stirring for two hours at 40° C., the mixture is cooled, filtered, washed with water and, after drying, fractionally distilled.

According to process variant (b), the calculated amount of chlorine is expediently introduced into the reaction solution at room temperature. The mixture is then freed of the volatile constituents by distillation at 60° C. and 4 mm. Hg, the residue is taken up in an organic solvent, for example ether, and, after washing and drying, the solvent is distilled off.

The following new products to be used according to the invention can be prepared according to the process stated in DAS (German published specification) 1,022,597:

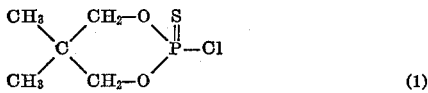

2-chloro-2-thiono-5,5 - dimethyl - 1,3,2 - dioxaphosphorinane.

Yield: 68% of the theory; M.P.: 85 to 86° C.

Calculated for $C_5H_{10}O_2ClSP$ (percent) (molecular weight 201): Cl, 17.7; S, 15.9; P, 15.4. Found (percent): Cl, 17.1; S, 15.7; P, 15.3.

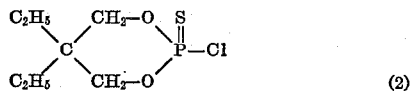

2-chloro-2-thiono-5,5-diethyl-1,3,2-dioxaphosphorinane.

Yield: 74% of the theory; M.P.: 64° C.

Calculated for $C_7H_{14}O_2ClSP$ (percent) (molecular weight 229): Cl, 15.5; S, 14.0; P, 13.5. Found (percent): Cl, 15.4; S, 13.8; P, 13.7.

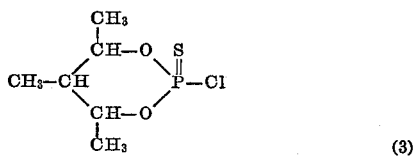

2-chloro-2-thiono-4,5,6-trimethyl - 1,3,2 - dioxaphosphorinane.

Yield: 73% of the theory; B.P. 142° C./10 mm. Hg; $n_D^{22}=1.5130$.

Calculated for $C_6H_{12}O_2ClSP$ (percent) (molecular weight 215): Cl, 16.55; S, 14.9; P, 14.5. Found (percent): Cl, 16.5; S, 14.2; P, 14.7.

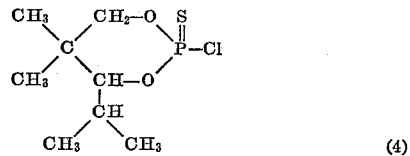

2-chloro-2-thiono-5,5-dimethyl-6-isopropyl - 1,3,2 - dioxaphosphorinane.

Yield: 66% of the theory; M.P. 67 to 69° C.

Calculated for $C_8H_{16}O_2ClSP$ (percent) (molecular weight 243): S, 13.2; P, 12.8. Found (percent): S, 12.7; P, 13.0.

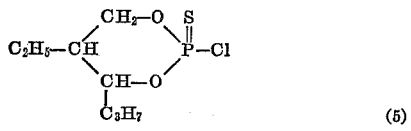

2-chloro-2-thiono-5-ethyl-6-n-propyl - 1,3,2 - dioxaphosphorinane.

Yield: 82% of the theory; $n_D^{23}=1.5040$.

Calculated for $C_8H_{16}O_2ClSP$ (percent) (molecular weight 243): Cl, 14.7; P, 12.8. Found (percent): Cl, 14.2; P, 12.6.

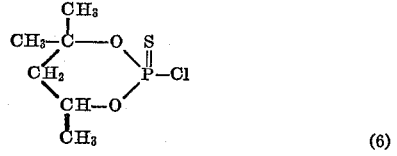

2-chloro-2-thiono-4,4,6-trimethyl - 1,3,2 - dioxaphosphorinane.

Yield: 70% of the theory; $n_D^{22}=1.5098$.

Calculated for $C_6H_{12}O_2ClSP$ (percent) (molecular weight 215): Cl, 16.5; S, 14.9. Found (percent): Cl, 16.1; S, 15.0.

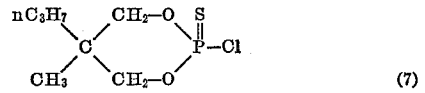

2-chloro-2-thiono-5-methyl-5-n-propyl - 1,3,2 - dioxaphosphorinane.

Yield: 79% of the theory; B.P. 90° C./0.01 mm. Hg; $n_D^{24}=1.5049$.

Calculated for $C_7H_{14}O_2ClSP$ (percent) (molecular weight 229): Cl, 15.5; P, 13.5. Found (percent): Cl, 16.0; P, 13.6.

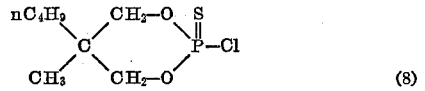

2-chloro-2-thiono-5-methyl-5-n-butyl - 1,3,2 - dioxaphosphorinane.

Yield: 71% of the theory; $n_D^{22}=1.5085$.

Calculated for $C_8H_{16}O_2ClSP$ (percent) (molecular weight 257): Cl, 13.8. Found (percent): Cl, 13.7.

As already mentioned above, the active compounds to be used according to the present invention are distinguished by outstanding insecticidal activity. They possess good activity against both sucking and biting insects and, at the same time, only a slight phytotoxicity. The effect sets in rapidly and is long-lasting. By reason of these properties, the products to be used according to the invention may be used in crop protection and the protection of stored products, as well as in the household hygiene field.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (coccina), for example the oleander scale (*Aspidiotus hederal*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*, and the like.

In the case of the biting insects contemplated herein above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta paddella*), the Mediterranean flour moth (*Ephestia kühniella*) and greater wax moth (*Galleria mellonella*), and the like.

Also to be classed with the biting insects contemplated herein are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry bettle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*) the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta;* further, Orthoptera, for example the house cricket (*Acheta domesticus*); termites such as the eastern subterranean termite (*Reticulitermes flavipes*) and Hymenoptera such as ants, for example the garden ant (*Lasius niger*), and the like.

The diptera contemplated herein comprise essentially the flies, such as the vinegar fly (*Dorsophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stabel fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*), and the like.

With the mites (Acari) contemplated herein there are classed, in particular, the spider mites (Tetranychidae) such as the two-spotted spider mite (*Tetranychus telarius=Tetranychus althaeae* or *Tetranychus urticae*) and the European red mite (*Paratetranychus pilosus= Panonychus ulmi*), blister mites, for example the current blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*), and the like.

When applied against household pests and pests of stored products, particularly flies and mosquitoes, the composition contemplated herein are also distinguished by an outstanding residual activity on wood and clay as well as good stability to alkali on limed substrates.

The active compounds according to the instant invention can be utilized, if desired, in the form of the usual formulations or compositions with conventional inert (i.e. plant compatible or herbicidally inert) pesticide diluents or extenders of the type usable in conventional pesticide formulations or compositions, e.g. conventional pesticide dispersible carrier vehicles, such as solutions, emulsions suspensions, emulsifiable concentrates, spray powders, pastes, soluble powders, dustring agents, granules, etc. These are prepared in known manner, for instance by extending the active compounds with conventional pesticide liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chloro-benzenes), paraffins (e.g. petroleum fractions), chlorinated aliphatic hydrocarbons (e.g. methylene chloride, etc.), alcohols (e.g. methanol, ethanol, propanol, butanol, etc.), ethers, ether-alcohols (e.g. glycol monomethyl ether, etc.), amines (e.g. ethanol-amine, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other acaricides and insecticides, or herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active compound or even the 100% active substance alone, e.g. about 20–100% by weight of the active compound.

Furthermore, the present invention contemplates methods of selectively killing, combatting or controlling insects which comprise applying to such insects and/or their habitat, i.e. the locus to be protected, a correspondingly combative or toxic amount, i.e. an insecticidally effective amount, of the particular compound alone or together with a carrier vehicle as noted above. The instant formulations or compositions are applied in the usual manner, for example by spraying, atomizing, vaporizing, scattering, dusting, watering, sprinkling, squirting, and the like.

It will be realized, of course, that the concentration of the particular active compound utilized, alone or in admixture with the carrier vehicle, will depend upon the intended application, as the artisan will appreciate, and may be varied within a fairly wide range. Therefore, in special cases, it is possible to go above or below the aforementioned concentration ranges.

The following examples illustrate, without limitation, the insecticidal activity of the particular active compounds and/or compositions according to the present invention.

EXAMPLE 1

Plutella test:
Solvent: 3 parts by weight acetone,
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from the following Table 1:

TABLE 1
(Plutella test)

| Active compound (constitution) | Concentration of active compound in percent | Degree of destruction in percent after 3 days |
|---|---|---|
| (A) $CH_3$, $CH_2-O$, $C$, $CH_3$, $CH_2-O$, $P(=S)-N(C_2H_5)_2$ (known) | 0.1 / 0.01 | 80 / 0 |
| (1) $CH_3$, $CH_2-O$, $C$, $CH_3$, $CH_2-O$, $P(=S)-Cl$ | 0.1 / 0.01 | 100 / 100 |
| (2) $C_2H_5$, $CH_2-O$, $C$, $C_2H_5$, $CH_2-O$, $P(=S)-Cl$ | 0.1 / 0.01 / 0.001 | 100 / 100 / 100 |
| (7) $n-C_3H_7$, $CH_2-O$, $C$, $CH_3$, $CH_2-O$, $P(=S)-Cl$ | 0.1 / 0.01 / 0.001 | 100 / 100 / 60 |
| (3) $CH_3$–$CH$–$O$, $CH_3$–$CH$, $CH-O$, $CH_3$, $P(=S)-Cl$ | 0.1 / 0.01 / 0.001 / 0.0001 | 100 / 100 / 100 / 45 |
| (4) $CH_3$, $CH_2-O$, $C$, $CH_3$, $CH-O$, $CH(CH_3)_2$, $P(=S)-Cl$ | 0.1 / 0.01 / 0.001 | 100 / 100 / 40 |

TABLE 1—Continued

| Active compound (constitution) | Concentration of active compound in percent | Degree of destruction in percent after 3 days |
|---|---|---|
| (6) $CH_3$, $CH_3-C-O$, $CH_2$, $CH-O$, $CH_3$, $P(=S)-Cl$ | 0.1 / 0.01 / 0.001 | 100 / 100 / 70 |
| (5) $C_2H_5-CH$, $CH_2-O$, $CH-O$, $C_3H_7$, $P(=S)-Cl$ | 0.1 / 0.01 | 100 / 100 |
| (8) $n-C_3H_9$, $C_2H_5$, $C$, $CH_2-O$, $CH_2-O$, $P(=S)-Cl$ | 0.1 / 0.01 | 100 / 100 |

EXAMPLE 2

Phaedon larvae test:
Solvent: 3 parts by weight acetone,
Emulsifier: 1 part by weight alkylaryl polyglycol ether.

To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all of the beetle larvae are killed. 0% means that none of the beetle larvae are killed.

The active compounds, the concentration of the active compounds, the times of evaluation and the results can be seen from the following Table 2:

TABLE 2
(Phaedon larvae test)

| Active compound (constitution) | Concentration of active compound in percent | Degree of destruction in percent after 3 days |
|---|---|---|
| (A) $CH_3$, $CH_2-O$, $C$, $CH_3$, $CH_2-O$, $P(=S)-N(C_2H_5)_2$ (known) | 0.1 | 0 |
| (1) $CH_3$, $CH_2-O$, $C$, $CH_3$, $CH_2-O$, $P(=S)-Cl$ | 0.1 / 0.01 | 100 / 75 |
| (2) $C_2H_5$, $CH_2-O$, $C$, $C_2H_5$, $CH_2-O$, $P(=S)-Cl$ | 0.1 / 0.01 | 100 / 100 |
| (3) $CH_3$–$CH$–$O$, $CH_3$–$CH$, $CH-O$, $CH_3$, $P(=S)-Cl$ | 0.1 / 0.01 / 0.001 | 100 / 100 / 30 |

TABLE 2—Continued

| Active compound (constitution) | Concentration of active compound in percent | Degree of destruction in percent after 3 days |
|---|---|---|
| (4) CH₃\C(CH₃)(CH₂-O)/P(=S)-Cl with CH-O-CH(CH₃)₂ | 0.1<br>0.01<br>0.001 | 100<br>100<br>30 |
| (6) CH₃, CH₃-C-O, CH₂, CH-O-CH₃ ring with P(=S)-Cl | 0.1<br>0.01 | 100<br>100 |
| (5) C₂H₅-CH(CH₂-O)/P(=S)-Cl with CH-O-C₃H₇ | 0.1<br>0.01 | 100<br>100 |
| (8) n-C₄H₉\C(C₂H₅)(CH₂-O)₂/P(=S)-Cl | 0.1<br>0.01 | 100<br>100 |

EXAMPLE 3

Myzus test (contact action):
  Solvent: 3 parts by weight acetone,
  Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 3:

TABLE 3
(Myzus test)

| Active compound (constitution) | Concentration of active compound in percent | Degree of destruction in percent after 24 hours |
|---|---|---|
| (A) CH₃\C(CH₃)(CH₂-O)₂/P(=S)-N(C₂H₅)₂ (known) | 0.1<br>0.01 | 20<br>0 |
| (1) CH₃\C(CH₃)(CH₂-O)₂/P(=S)-Cl | 0.1 | 100 |
| (2) C₂H₅\C(C₂H₅)(CH₂-O)₂/P(=S)-Cl | 0.1<br>0.01 | 100<br>98 |

TABLE 3—Continued

| Active compound (constitution) | Concentration of active compound in percent | Degree of destruction in percent after 24 hours |
|---|---|---|
| (7) nC₃H₇\C(CH₃)(CH₂-O)₂/P(=S)-Cl | 0.1<br>0.01 | 100<br>90 |
| (3) CH₃\CH-O, CH₃-CH, CH-O-CH₃ / P(=S)-Cl | 0.1<br>0.01 | 100<br>90 |
| (4) CH₃\C(CH₃)(CH₂-O)/P(=S)-Cl with CH-O-CH(CH₃)₂ | 0.1<br>0.01 | 100<br>90 |
| (6) CH₃\C(CH₃)-O, CH₂, CH-O-CH₃ / P(=S)-Cl | 0.1<br>0.01 | 100<br>90 |
| (5) C₂H₅-CH(CH₂-O)/P(=S)-Cl with CH-O-C₃H₇ | 0.1<br>0.01 | 100<br>90 |
| (8) n-C₄H₉\C(C₂H₅)(CH₂-O)₂/P(=S)-Cl | 0.1 | 100 |

EXAMPLE 4

Rhopalosiphum test (systemic action):
  Solvent: 3 parts by weight acetone,
  Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

Oat plants (*Avena sativa*) which have been strongly infested with oat aphids (*Rhopalosiphum padi*) are watered with the preparation of the active compound so that the preparation penetrates into the soil without wetting the leaves of the oat plants. The active compound is taken up by the oat plants from the soil and thus reaches the infested leaves.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 4:

TABLE 4
(Rhopalosiphum test—systemic)

| Active compound (constitution) | Concentration of active compound in percent | Degree of destruction in percent after 4 days |
|---|---|---|
| (A) CH₃, CH₃ / C / CH₂—O, CH₂—O \ P(=S)—N(C₂H₅)₂ (known) | 0.1 | 0 |
| (B) C₂H₅, C₂H₅ / C / CH₂—O, CH₂—O \ P(=S)—F (known) | 0.1 / 0.01 | 95 / 0 |
| (1) CH₃, CH₃ / C / CH₂—O, CH₂—O \ P(=S)—Cl | 0.1 / 0.01 | 100 / 100 |
| (2) C₂H₅, C₂H₅ / C / CH₂—O, CH₂—O \ P(=S)—Cl | 0.1 / 0.01 | 100 / 70 |
| (7) n-C₃H₇, CH₃ / C / CH₂—O, CH₂—O \ P(=S)—Cl | 0.1 | 100 |
| (3) CH₃—CH(CH₃)—CH< / CH—O, CH—O \ P(=S)—Cl (with CH₃ on each CH) | 0.1 / 0.01 / 0.001 | 100 / 100 / 40 |
| (4) CH₃, CH₃ / C / CH₂—O, CH—O \ P(=S)—Cl ; CH—O bearing CH(CH₃)₂ | 0.1 / 0.01 | 100 / 100 |

TABLE 5
(Tetranychus test)

| Active compound (constitution) | Concentration of active compound in percent | Degree of destruction in percent after 48 hours |
|---|---|---|
| (A) CH₃, CH₃ / C / CH₂—O, CH₂—O \ P(=S)—N(C₂H₅)₂ (known) | 0.1 | 0 |
| (1) CH₃, CH₃ / C / CH₂—O, CH₂—O \ P(=S)—Cl | 0.1 | 90 |
| (2) C₂H₅, C₂H₅ / C / CH₂—O, CH₂—O \ P(=S)—Cl | 0.1 | 100 |
| (7) n-C₃H₇, CH₃ / C / CH₂—O, CH₂—O \ P(=S)—Cl | 0.1 | 65 |
| (3) CH₃—CH(CH₃)—C(CH₃)< / CH—O, CH—O \ P(=S)—Cl | 0.1 | 90 |
| (4) CH₃, CH₃ / C / CH₂—O, CH—O \ P(=S)—Cl ; CH—O bearing CH(CH₃)₂ | 0.1 | 95 |
| (6) CH₃—C(CH₃)(CH₂—)< with O, CH—O(CH₃) \ P(=S)—Cl | 0.1 | 99 |

EXAMPLE 5

Tetranychus test:

Solvent: 3 parts by weight acetone,
Emulsifier: 1 part by weight alkylaryl polyglycol ether.

To produce a suitable preparation of active compound 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of developemnt.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 5:

EXAMPLE 6

LD₁₀₀ test:

Test insects: Granary weevils (*Sitophilus granarius*),
Solvent: Acetone.

2 parts by weight of the active compound are dissolved in 1,000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed 3 days after the commencement of the experiments. The knock down effect is determined as a percentage.

The active compounds, the concentrations of the active compounds, the test insects and the results can be seen from the following Table 6:

TABLE 6
(LD$_{100}$ test Sitophilus granarius)

| Active compound (constitution) | Concentration of active compound in percent | Destruction in percent |
|---|---|---|
| (A) CH$_3$–C(CH$_3$)(CH$_2$–O)$_2$P(S)–N(C$_2$H$_5$)$_2$ (known) | 0.2 | 5 |
| (B) C$_2$H$_5$–C(C$_2$H$_5$)(CH$_2$–O)$_2$P(S)–F (known) | 0.2<br>0.04<br>0.008<br>0.0016 | 100<br>100<br>100<br>15 |
| () C$_2$H$_5$–C(C$_2$H$_5$)(CH$_2$–O)$_2$P(S)–Cl | 0.2<br>0.04<br>0.008<br>0.0016<br>0.00032 | 100<br>100<br>100<br>100<br>35 |
| 3) CH$_3$–CH(CH$_3$)(CH–O)$_2$P(S)–Cl (with CH$_3$ branches) | 0.2<br>0.04<br>0.008<br>0.0016 | 100<br>100<br>100<br>100 |

EXAMPLE 7

LD$_{100}$ test:
Test insects: Skin beetle larvae (*Dermestes peruvianus*),
Solvent: Acetone.

2 parts by weight of the active compound are dissolved in 1,000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed 3 days after the commencement of the experiments. The knock down effect is determined as a percentage.

The active compounds, the concentrations of the active compounds, the test insects and the results can be seen from the following Table 7:

TABLE 7
(LD$_{100}$ test/ Dermestes peruvianus)

| Active compound (constitution) | Concentration of active compound in percent | Destruction in percent |
|---|---|---|
| (A) CH$_3$–C(CH$_3$)(CH$_2$–O)$_2$P(S)–N(C$_2$H$_5$)$_2$ (known) | 0.2 | 0 |
| (B) C$_2$H$_5$–C(C$_2$H$_5$)(CH$_2$–O)$_2$P(S)–F (known) | 0.2<br>0.04<br>0.008 | 100<br>100<br>60 |
| (2) C$_2$H$_5$–C(C$_2$H$_5$)(CH$_2$–O)$_2$P(S)–Cl | 0.2<br>0.04<br>0.008<br>0.0016 | 100<br>100<br>100<br>0 |
| (3) CH$_3$–CH(CH$_3$)(CH–O)$_2$P(S)–Cl (with CH$_3$) | 0.2<br>0.04<br>0.008<br>0.0016<br>0.00032 | 100<br>100<br>100<br>100<br>0 |
| (5) C$_2$H$_5$–CH(CH$_2$–O)$_2$P(S)–Cl | 0.2<br>0.04<br>0.008<br>0.0016 | 100<br>100<br>100<br>40 |
| (4) CH$_3$–C(CH$_3$)(CH$_2$–O)(CH–O)P(S)–Cl (with CH(CH$_3$)$_2$) | 0.2<br>0.04<br>0.008<br>0.0016<br>0.00032 | 100<br>100<br>100<br>100<br>80 |

EXAMPLE 8

LD$_{100}$ test:
Test insects: House crickets (*Acheta domesticus*),
Solvent: Acetone.

2 parts by weight of the active compound are dissolved in 1,000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed 3 days after the commencement of the experiments. The knock down effect is determined as a percentage.

The active compounds, the concentrations of the active compounds, the test insects and the results can be seen from the following Table 8:

TABLE 8
(LD$_{100}$ test/Acheta domesticus)

| Active compound (constitution) | Concentration of active compound in percent | Destruction in percent |
|---|---|---|
| (B) C$_2$H$_5$–C(C$_2$H$_5$)(CH$_2$–O)$_2$P(S)–F (known) | 0.2<br>0.04<br>0.008<br>0.0016<br>0.00032 | 100<br>100<br>100<br>80<br>60 |
| (A) CH$_3$–C(CH$_3$)(CH$_2$–O)$_2$P(S)–N(C$_2$H$_5$)$_2$ (known) | 0.2 | 0 |
| (2) C$_2$H$_5$–C(C$_2$H$_5$)(CH$_2$–O)$_2$P(S)–Cl | 0.2<br>0.04<br>0.008<br>0.0016<br>0.000064 | 100<br>100<br>100<br>100<br>20 |

TABLE 8—Continued

| Active compound (constitution) | Concentration of active compound in percent | Destruction in percent |
|---|---|---|
| (3) CH₃–CH(CH₃)–CH(O–)₂–P(=S)–Cl with CH–CH₃ groups | 0.2 | 100 |
|  | 0.04 | 100 |
|  | 0.008 | 100 |
|  | 0.0016 | 100 |
|  | 0.00032 | 100 |
|  | 0.000064 | 0 |

EXAMPLE 9

$LD_{100}$ test:

Test insects: Oriental cockroach (*Blatta orientalis*),
Solvent: Acetone.

2 parts by weight of the active compound are dissolved in 1,000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed 3 days after the commencement of the experiments. The knock down effect is determined as a percentage.

The active compounds, the concentrations of the active compounds, the test insects and the results can be seen from the following Table 9:

TABLE 9
($LD_{100}$ test/*Blatta orientalis*)

| Active compound (constitution) | Concentration of active compound in percent | Destruction in percent |
|---|---|---|
| (A) CH₃/CH₃ C(CH₂–O)₂P(=S)–N(C₂H₅)₂ (known) | 0.2 | 20 |
| (B) C₂H₅/C₂H₅ C(CH₂–O)₂P(=S)–F (known) | 0.2 | 100 |
|  | 0.04 | 100 |
|  | 00.08 | 20 |
|  | 0.0016 | 0 |
| (2) C₂H₅/C₂H₅ C(CH₂–O)₂P(=S)–Cl | 0.2 | 100 |
|  | 0.04 | 100 |
|  | 0.008 | 80 |
|  | 0.0016 | 80 |
|  | 0.00032 | 0 |
| (7) n-C₃H₇/CH₃ C(CH₂–O)₂P(=S)–Cl | 0.2 | 100 |
|  | 0.04 | 100 |
|  | 0.008 | 100 |
|  | 0.0016 | 0 |
| (3) CH₃–CH(CH₃)–CH(O–)₂–P(=S)–Cl with CH–CH₃ | 0.2 | 100 |
|  | 0.04 | 100 |
|  | 0.008 | 100 |
|  | 0.0016 | 100 |
|  | 0.00032 | 0 |

EXAMPLE 10

$LT_{100}$ test for Diptera:

Test insects: House flies (*Musca domestica*),
Solvent: Acetone.

2 parts by weight of active compound are dissolved in 1,000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is continuously observed. The time which is necessary for a 100% knock down effect is determined.

The test insects, the active compounds, the concentrations of the active compounds and the periods of time at which there is a 100% knock down effect can be seen from the following Table 10:

TABLE 10
($LT_{100}$ test for *Diptera Musca domesteca*)

| Active compound (constitution) | Concentration of active compound in the solution in percent | $LT_{100}$ |
|---|---|---|
| (A) CH₃/CH₃ C(CH₂–O)₂P(=S)–N(C₂H₅)₂ (known) | 0.2 | 8ʰ=0% |
| (1) CH₃/CH₃ C(CH₂–O)₂P(=S)–Cl | 0.2 | 45' |
|  | 0.04 | 150' |
|  | 0.008 | 6ʰ |
|  | 0.0016 | 8ʰ=85% |
| (2) C₂H₅/C₂H₅ C(CH₂–O)₂P(=S)–Cl | 0.2 | 45' |
|  | 0.04 | 75' |
|  | 0.008 | 150' |
|  | 0.0016 | 210' |
|  | 0.00032 | 8ʰ=90% |
| (7) n-C₃H₇/CH₃ C(CH₂–O)₂P(=S)–Cl | 0.2 | 80' |
|  | 0.04 | 150' |
|  | 0.008 | 6ʰ |
|  | 0.0016 | 8ʰ=60% |
| (3) CH₃–CH(CH₃)–CH(O–)₂–P(=S)–Cl with CH–CH₃ | 0.2 | 75' |
|  | 0.04 | 75' |
|  | 0.008 | 5ʰ |
|  | 0.0016 | 6ʰ |
|  | 0.00032 | 8ʰ=10% |
| (5) C₂H₅–CH(CH₂–O)₂–P(=S)–Cl with CH–O–C₃H₇ | 0.2 | 60' |
|  | 0.04 | 105' |
|  | 0.008 | 180' |
|  | 0.0016 | 4ʰ |
|  | 0.00032 | 8ʰ=50% |
| (4) CH₃/CH₃ C(CH₂–O)₂P(=S)–Cl with CH(CH₃)₂ | 0.2 | 180' |
|  | 0.04 | 5ʰ |
|  | 0.008 | 8ʰ |
|  | 0.0016 | 8ʰ |

EXAMPLE 11

$LD_{100}$ test:

Test insects: Khapra bettle larave (*Trogoderma granarium*),
Solvent: Acetone.

2 parts by weight of the active compound are dissolved in 1,000 parts by volume of the solvent. The solution so obtained is diluted wtih further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed 3 days after the commencement of the experiments. The knock down effect is determined as a percentage.

The active compounds, the concentrations of the active compounds, the test insects and the results can be seen from the following Table 11:

TABLE 11
($LD_{100}$ test/*Trogoderma granarium*)

| Active compound (constitution) | Concentration of active compound in percent | Destruction in percent |
|---|---|---|
| (A) CH₃ CH₂—O S \C/ \P—N(C₂H₅)₂ / \ / CH₃ CH₂—O (known) | 0.2 | 0 |
| (B) C₂H₅ CH₂—O S \C/ \P—F / \ / C₂H₅ CH₂—O (known) | 0.2 | 40 |
| (1) CH₃ CH₂—O S \C/ \P—Cl / \ / CH₃ CH₂—O | 0.2<br>0.04<br>0.008<br>0.0016 | 100<br>80<br>80<br>20 |
| (2) C₂H₅ CH₂—O S \C/ \P—Cl / \ / C₂H₅ CH₂—O | 0.2<br>0.04<br>0.008<br>0.0016 | 100<br>100<br>100<br>0 |
| (7) n-C₃H₇ CH₂—O S \C/ \P—Cl / \ / CH₃ CH₂—O | 0.2<br>0.04 | 100<br>20 |
| (3) CH₃ \|  CH—O S CH₃—CH \P—Cl \  CH—O \|  CH₃ | 0.2<br>0.04<br>0.008<br>0.0016 | 100<br>100<br>100<br>20 |
| (5) CH₂—O S C₂H₅—CH \P—Cl \  CH—O \|  C₃H₇ | 0.2<br>0.04<br>0.008<br>0.0016 | 100<br>100<br>80<br>0 |
| (4) CH₃ CH₂—O S \C/ \P—Cl / \ / CH₃ CH—O \|  CH / \ CH₃ CH₃ | 0.2<br>0.04<br>0.008<br>0.0016 | 100<br>100<br>100<br>60 |

It will be appreciated that the instant specification and examples are set forth by way of illustration and not limitation, and that various modifications and changes may be made without departing from the spirit and scope of the present invention.

What is claimed is:

1. A method of combating insects which comprises applying to the insects or an insect habitat an insecticidally effective amount of a 2-chloro-2-thiono-1,3-2-dioxaphosphorinane of the formula

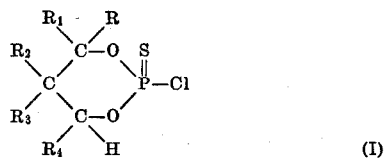

in which
each of the radicals R, $R_1$, $R_2$, $R_3$ and $R_4$ denotes a hydrogen atom or a straight-chain or branched lower alkyl group with 1 to 4 carbon atoms, with the proviso that at least two of these radicals denote alkyl groups.

2. The method according to claim 1, in which each of the radicals of the 2-chloro-2-thiono-1,3,2-dioxaphosphorinane denotes hydrogen, methyl, ethyl, n-propyl or isopropyl.

3. The method according to claim 1 in which the active ingredient is 2-chloro-2-thiono-5,5-dimethyl-1,3,2-dioxaphosphorinane of the formula

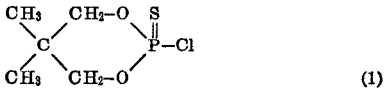

4. The method according to claim 1 in which the active ingredient is 2 - chloro-2-thiono-5,5-diethyl-1,3,2-dioxaphosphorinane of the formula

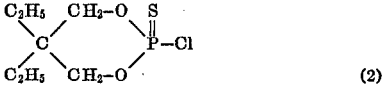

5. The method according to claim 1 in which the active ingredient is 2-chloro-2-thiono-5-methyl-5-n-propyl-1,3,2-dioxaphosphorinane of the formula

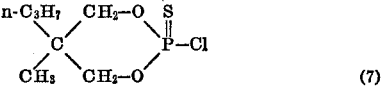

6. The method according to claim 1 in which the active ingredient is 2-chloro-2-thiono-4,5,6-trimethyl-1,3,2-dioxaphosphorinane of the formula

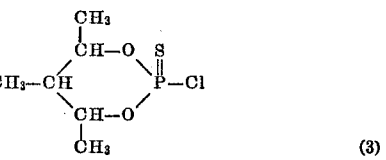

7. The method according to claim 1 in which the active ingredient is 2-chloro-2-thiono-5,5-dimethyl-6-isopropyl-1,3,2-dioxaphosphorinane of the formula

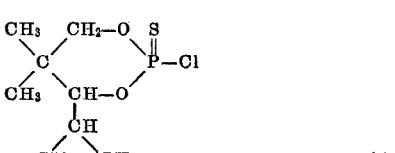

8. The method according to claim 1 in which the active ingredient is 2-chloro-2-thiono-4,4,6-trimethyl-1,3,2-dioxaphosphorinane of the formula

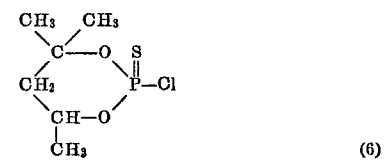

9. The method according to claim 1 in which the active ingredient is 2-chloro-2-thiono-5-ethyl-6-n-propyl-1,3,2-dioxaphosphorinane of the formula

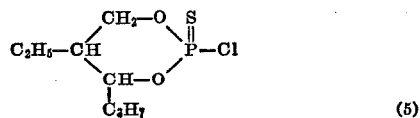

(5)

10. The method according to claim 1 in which the active ingredient is 2-chloro-2-thiono-5-methyl-5-n-butyl-1,3,2-dioxaphosphorinane of the formula

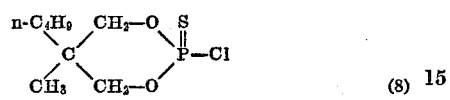

(8)

References Cited

UNITED STATES PATENTS 2,922,813   1/1960   Lanham _____ 260—937

FOREIGN PATENTS 1,022,597   1/1958   Germany.

ALBERT T. MEYERS, Primary Examiner
V. D. TURNER, Assistant Examiner

U.S. Cl. X.R.

260—937